(12) United States Patent
Varady et al.

(10) Patent No.: US 6,229,302 B1
(45) Date of Patent: May 8, 2001

(54) METHOD OF SENSING ROTATIONAL INFORMATION OF SHAFT WITH TOOTHED WHEEL

(75) Inventors: Arthur Joseph Varady, Chelsea; John Michael Kacewicz, Riverview; Robert Joseph Dalbo, Allen Park; Sheran Anthony Alles, Westland; Thomas J. Hermann, Troy, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/233,612

(22) Filed: Jan. 19, 1999

(51) Int. Cl.[7] ........................................ G01B 7/30
(52) U.S. Cl. ................. 324/207.25; 324/207.22; 341/15
(58) Field of Search ............. 324/207.22, 207.25, 324/207.15, 165, 166, 173, 174; 341/15; 73/116; 123/406.6

(56) References Cited

U.S. PATENT DOCUMENTS

| 4,742,332 | * | 5/1988 | Schroeder et al. ............... 341/15 |
|---|---|---|---|
| 5,086,272 | | 2/1992 | Hinrichsen . |
| 5,107,213 | | 4/1992 | Ponticelli et al. . |
| 5,264,789 | | 11/1993 | Braun et al. . |
| 5,430,370 | | 7/1995 | Rooke . |
| 5,497,748 | * | 3/1996 | Ott et al. ............................. 123/406.6 |
| 5,559,705 | * | 9/1996 | McClish et al. ..................... 701/110 |
| 5,606,252 | | 2/1997 | Gschossmann et al. . |
| 5,703,283 | * | 12/1997 | McClish et al. ..................... 73/116 |

\* cited by examiner

*Primary Examiner*—Christine Oda
*Assistant Examiner*—Subhash Zaveri
(74) *Attorney, Agent, or Firm*—Jennifer M. Stec

(57) ABSTRACT

A method for more accurately sensing the rotational position of a shaft having a toothed sensor wheel with a missing tooth is disclosed. The method includes employing an inductive sensor to produce a signal in response to the passing of the teeth on the sensor wheel. The sensor signal is altered by the geometry of the wheel about a gap formed by the missing tooth in order to correct for residual stored energy in the sensor at this location, and thus correct the signal for the timing measured by a processor in communication with the sensor.

20 Claims, 2 Drawing Sheets

METHOD OF SENSING ROTATIONAL INFORMATION OF SHAFT WITH TOOTHED WHEEL

FIELD OF THE INVENTION

The present invention relates to magnetic rotary sensing systems, and more particularly to improved accuracy in rotary sensing when employing a toothed wheel. This patent application is related to co-pending patent application titled MAGNETIC ROTARY POSITION SENSING, filed herewith.

BACKGROUND OF THE INVENTION

For rotating members, in particular rotating shafts, it is sometimes necessary to receive accurate rotational information, which may be rotational position, velocity, and acceleration information. Various sensing systems have been developed to accomplish this task.

One sensing system in particular that works well in relatively harsh environments, such as with a crankshaft of an internal combustion engine, is a toothed sensor wheel. For this particular sensing system, the wheel is ferromagnetic and an inductive (magnetic field) sensor is located near the wheel periphery. As the wheel rotates, the teeth pass by the sensor, changing the magnetic field. The information is then communicated to a processor via a generally sinusoidal voltage signal from the sensor. This works generally well since it is non-contact—there are no rubbing parts to wear out, dirt and oil won't generally interfere with the signal, and the temperature effects are minimal. Generally the sensor wheel will have a series of teeth that are the same size and evenly spaced circumferentially about the wheel, with one of the teeth missing. The missing tooth location will provide a gap for indexing, to determine the absolute rotational position. This information can then be used for generally controlling engine operating parameters, such as ignition timing, fuel injector timing, etc.

While the information provided by the sensor system is sufficient for conventional internal combustion engines, the need arises to increase the accuracy of readings for this type of system in order to obtain more precise engine operation information. An example of such an instance is the desire to use a toothed crankshaft sensor wheel to detect engine cylinder misfires. It must be very precise because the slight acceleration of the crankshaft due to a cylinder firing must be determined. For this type of calculation, as little as 10 microseconds error may be too much to obtain the desired accuracy.

In general the toothed wheel sensor system produces a sinusoidal signal that has periodic zero crossings (i.e. where the voltage is zero). These zero crossings are subsequently used for determining the rotational information needed for misfire detection. The sinusoidal signal is sent to a processor for generation of a square wave from which edges are time stamped for further digital signal processing as part of a misfire monitor.

An accuracy concern arises however around the location of the missing tooth. For these inductive sensors, the missing tooth location provides for a different rate of change in magnetic flux linkage than do the other teeth on the wheel, so that residual stored energy will occur due to the loss of this flux coupling at the location of the missing tooth. The additional energy is stored in the inductor of the sensor and decays based on the particular sensor and input circuit characteristics. This residual energy will then result in higher voltages, affecting the signal for a few teeth past the gap as the excess energy decays, inherently causing a time delay in the zero crossing of the signal and hence increases the variation in the edge placement for the square waves which are subsequently generated. This, then, results in inaccurate time stamp data at these locations. The need arises then for compensation in the signal due to the energy storage in the inductive sensor.

One method of correction employed is to take the signal from the sensor as is, with the error, and employ software in a signal processor to manipulate the signal in order to compensate for the error. However, the accuracy can be less than satisfactory since the correction is based on operation at a given operating speed to minimize the software complexity, and as the rotational speed varies from the given speed, the accuracy of the error correction is reduced.

Thus, it is desirable to assure accuracy in the signal initially sent from the inductive sensor, (i.e. reduce the error at the source), and avoid the need for the error compensation in the software of the signal processor in order to obtain accurate rotational acceleration data from a sensor wheel.

SUMMARY OF THE INVENTION

In its embodiments, the present invention contemplates a method of sensing rotational position of a shaft with a sensor wheel rotationally fixed thereto having n minus 1 teeth spaced about a periphery of the wheel and forming a gap. The method comprises the steps of: rotating the shaft in a predetermined direction about a center of rotation; creating a magnetic field proximate to the periphery of the wheel with a sensor; sensing the variations in magnetic flux in the magnetic field as the teeth pass; altering the magnetic flux in one of the gap and the teeth rotationally trailing the gap to account for the loss of flux coupling at the gap; creating a periodic signal in response to the variations in flux; and transmitting the periodic signal to a processor.

Accordingly an object of the present invention is to provide a method for generating accurate timing of signals produced by a toothed wheel, having a missing tooth configuration, and an inductive sensor, for generating an accurate signal for producing rotational position and acceleration information.

An advantage of the present invention is improved accuracy of the sensor signal without the need for electrical filtering of the signal by the signal processor.

An additional advantage of the present invention is that the signal correction is affective for all rotational speeds.

DETAILED DESCRIPTION OF THE PREFERRED EMBODIMENTS

Figure 1:
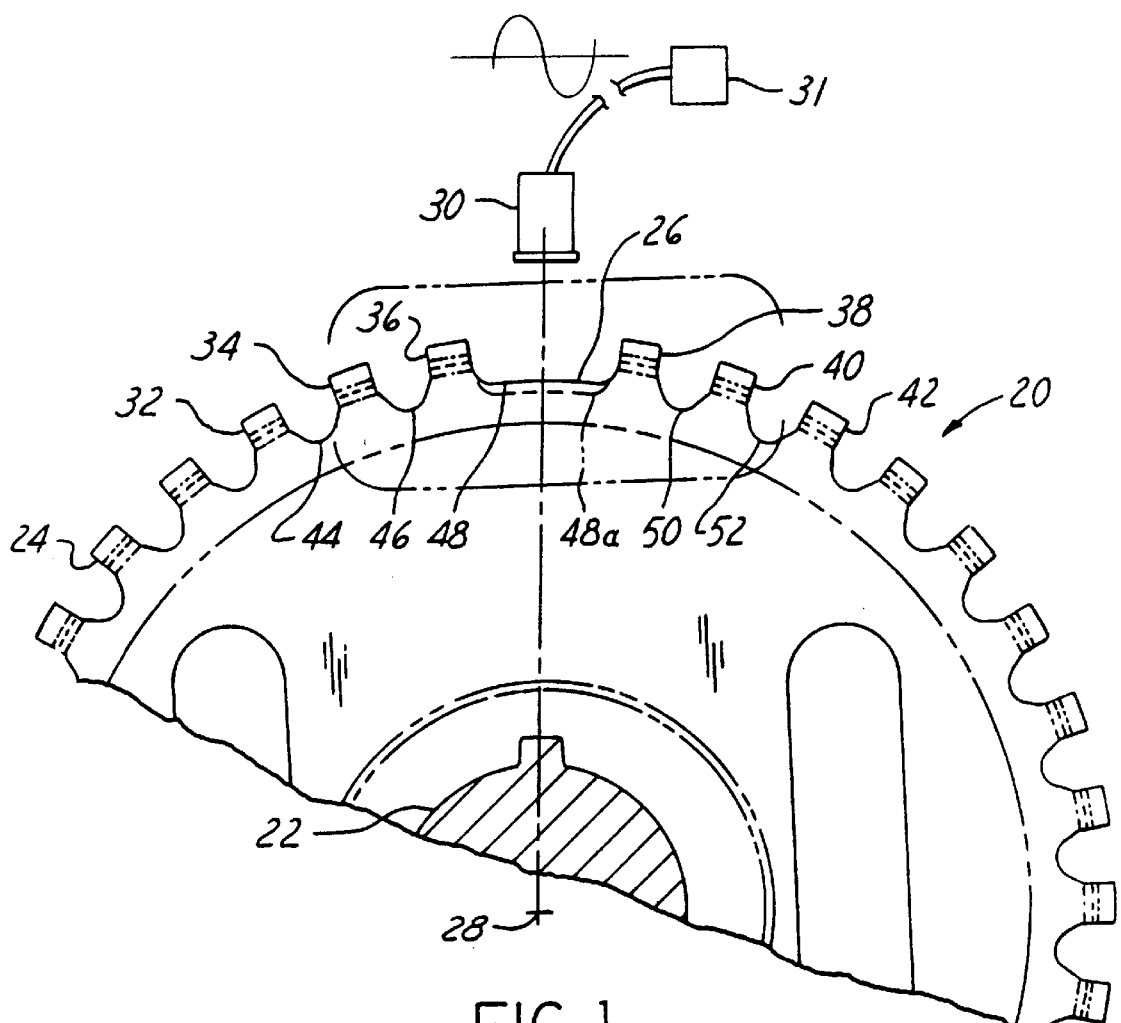
FIG. 1 is a view of a magnetic field sensor and a portion of a toothed sensor wheel connected to a rotary shaft in accordance with the present invention.
Figure 2:
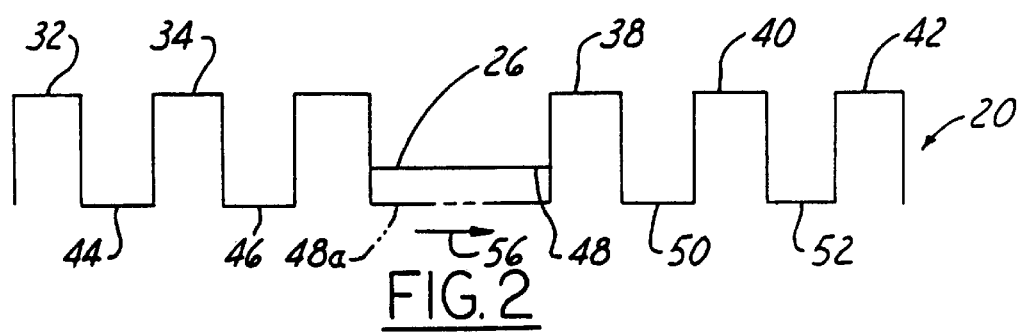
FIG. 2 is a schematic illustration, on an enlarged scale, of a portion of the toothed wheel shown in encircled area 2 in FIG. 1.

FIGS. 1 and 2 illustrate a sensor wheel 20 rotationally affixed to a rotating shaft 22. For purposes of this discussion, the shaft will be assumed to be a crankshaft employed in an internal combustion engine. The sensor wheel 20 includes a set of thirty six minus one teeth 24. By this it is meant that the tooth size and spacing is such that the leading edge of each tooth in the set 24 is ten degrees spaced from the leading edge (or trailing edge) of each of its adjacent teeth, with one tooth missing, thus making one gap 26 that has twenty degrees from the leading edge of one tooth to the next. While a configuration of 36-1 teeth is shown, there can be other numbers of teeth on the wheel, as desired for the particular application. The sensor wheel 20 is made of a ferromagnetic type of material so that the teeth will influence any particular magnetic field that they are passing through.

Mounted adjacent to the outer periphery of the wheel 20 is an inductive (magnetic field) sensor 30. This sensor 30 communicates with a processor 31 that will receive the data and convert it to rotational information, such as rotational position, velocity, and acceleration. The magnetic field sensor 30 may, for example, be a Hall Effect sensor, a variable reluctance sensor, or a magnetoresistive or magnetorestrictive sensor.

In accordance with the present invention there are specific teeth within the set 24 that may have varied geometries, generally located adjacent the gap 26. For the discussion herein, six teeth will be specifically discussed and will be labeled with element numbers 32–42. Also, the valleys, i.e. bottom lands, around these six teeth will be labeled with element numbers 44–52 for discussion herein. The rotation direction of the wheel 20 is indicated by arrow 56.

In general, all of the teeth 24 about the wheel 20 have the same height, so that the lands are at the same radial distance from the center of rotation 28 of the wheel 20. This center of rotation 28 is also the axis about which the shaft 22 rotates. Thus lands 44, 46, 50, and 52 are at the same radial distance. But there is an exception for the land 48 in the gap 26. The land 48 is radially farther from the center of rotation 28 than it normally would be, illustrated by phantom line 48a. What this does is provide extra ferromagnetic material to affect the magnetic flux in the area of the missing tooth without giving a false reading of a tooth in that location. The resulting effect will be discussed below in relation to the sensor system operation.

The sensor system operates generally at all times while the shaft 22 is rotating. As the shaft 22 rotates, the sensor wheel 20 rotates with it, causing the teeth 24 to pass by the inductive sensor 30. As each tooth passes, it alters the magnetic flux path relative to the gap just proceeding that tooth. This variation in magnetic flux is detected by the sensor 30, and transmitted as a signal to the processor 31. Because of the alternating between tooth and gap, a generally sinusoidal signal is created.

The sinusoidally varying signal, then, that is sent to the processor 31 will be manipulated thereby. The times at which the sinusoidal signal has zero crossings (i.e. where zero voltage occurs in the sinusoidal signal) is used to determine rotary information. This signal provides at least two different types of information from the same sensor 30 and sensing wheel 20. The first type is that used for the timing in general. The timing between the zero crossings of the sinusoidal signal is monitored by the processor 31, and when a relatively long time between crossings occurs, the processor will recognize this as the gap 26 for the missing tooth, thus giving absolute rotational position of the crankshaft 22 (i.e., the crank angle). This is the conventional use for the sensing system.

The second type of information from the signal is the timing between the zero crossings, employed by the microprocessor 31 to determine the rotational velocity. By time stamping the positions, the rotational velocity can be determined. Further, by knowing the timing of the zero crossings, changes in time between zero crossings is used by the processor 31 to determine rotational acceleration. The rotational acceleration information is needed in order to employ this sensing system as a cylinder misfire detector. By reading the rotational acceleration information, the processor 31 will be able to note whether each cylinder in the engine is firing properly, because as each cylinder fires during a combustion event, the crankshaft 22 will experience a slight acceleration. If the acceleration that should occur for a given cylinder combustion event is missing, then the processor 31 will recognize this and indicate such to, for example, a main engine control computer, not shown.

With such precise sensing needed, the concern then arises around the missing tooth location. A first preferred step to take is to only read the sensor signal for every other tooth, i.e. every twenty degrees, which will generally provide enough data points, while avoiding attempts to read the signal at the missing tooth location.

The sensor wheel 20 of the present invention also corrects for error around the missing tooth that would otherwise be due to the residual energy stored in the sensor 30. The difference in the radial location of the third land 48 relative to the other lands changes the geometry, and thus the magnetic flux path around the missing tooth location. The radial location of the land 48 is adjusted outward relative to the other lands so that the flux path around the missing tooth location is changed to equalize the induced emf (voltage) for fixed time intervals to match that for the rest of the sensor wheel 20. Put another way, this geometry will generally achieve a constant length flux path through the same permeability. The exact amount of adjustment depends upon several factors, including the shape and spacing of the teeth and the type of magnetic sensor employed (i.e. the electromagnetic characteristics of the sensor employed). The concern is not with the change in the shape of the sinusoidal signal, just with the timing of the zero crossings.

The radial location of the land provides a means for substantially eliminating the variation in the zero crossing timing due to the increased energy storage in the inductive sensor 30 at the gap 26, which in turn, reduces variation in the edge placement for the square waves generated from these zero crossings by the processor 31. This results in improved accuracy around the missing tooth location, thus resulting in improved misfire detection at this angle of crankshaft rotation.

Figure 3:
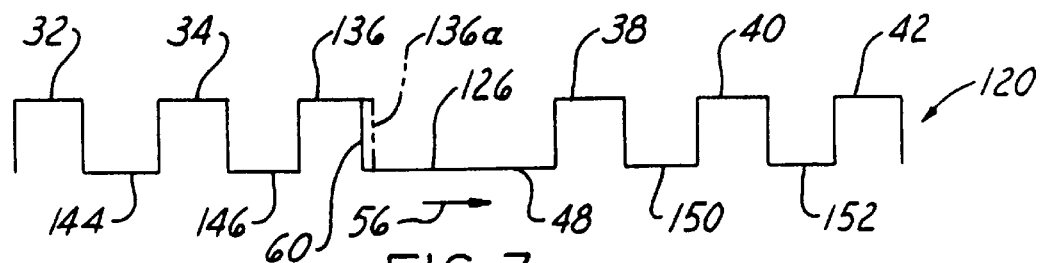
FIG. 3 is a view similar to FIG. 2, but illustrating a different embodiment of the present invention.

FIG. 3 illustrates six teeth of an alternate embodiment of the sensor wheel 120. For this embodiment, similar elements are similarly designated with the first embodiment, while changed elements are designated with a 100-series number. The depth of the land 48 in the gap 26 is the same for this embodiment as for the first embodiment. But the lands 144, 146, 150, 152 etc. between the other teeth 24 are now radially equal to the land 48. Otherwise, the teeth 32, 34, 38, 40 and 42 are the same as in the first embodiment. The tooth 136, though, is now narrower, with material removed from its leading edge 60. What was the full width tooth is indicated by phantom line 136a.

The tooth 136 corrects for the error in the zero crossings around the missing tooth by changing the flux path immediately after the gap 126. The flux path is changed in two ways, first the leading face 60 of the tooth is cut back creating a slight delay in time before the tooth 136 affects the sensor signal, and it is a narrower tooth, also affecting the flux path. These changes to the tooth 136 consequently change the timing of the zero crossing for the signal, correcting for the error introduced by the missing tooth location.

Figure 4:
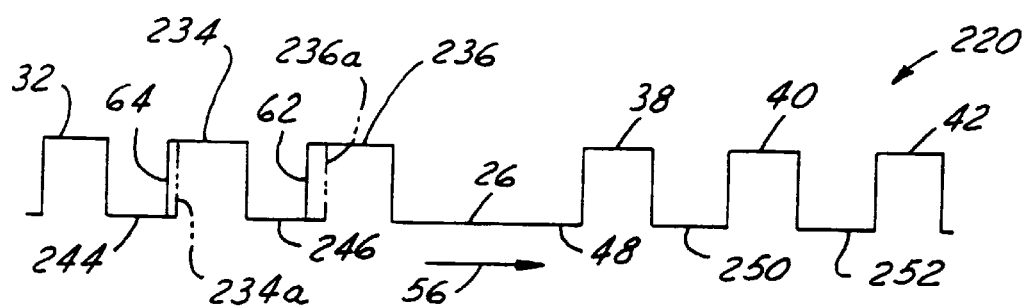
FIG. 4 is a view similar to FIG. 2, but illustrating another embodiment of the present invention.

FIG. 4 illustrates another alternate embodiment of the present invention showing six teeth of the sensor wheel 220. For this embodiment, similar elements are similarly designated with the first embodiment, while changed elements are designated with a 200-series number. The radial distance to the lands 244, 246, 250, 252 are the same as the land 48 in the gap 26; otherwise the teeth 32, 38, 40, 42 are the same. But the two teeth 234, 236 immediately trailing the gap 26 are varied in order to correct the timing of the zero crossings in the signal.

Tooth 236 is wider than the other teeth and has a trailing face 62 that is rotationally rearward of the location for the rest of the teeth. What the normal tooth width would be is indicated in phantom by trailing face 236a. Also, tooth 234 is wider than the other teeth, but narrower than tooth 236, with a trailing edge 64 behind the typical tooth, as indicated in phantom by face 234a. By pulling these trailing faces 62, 64 rotationally rearward, the zero crossings for the teeth trailing the gap 26 are corrected. This embodiment shows that one may wish to alter geometry of more than one tooth in order to assure the desired accuracy in the zero crossings since the residual effect in the sensor may not correct itself until several teeth have passed.

Figure 5:
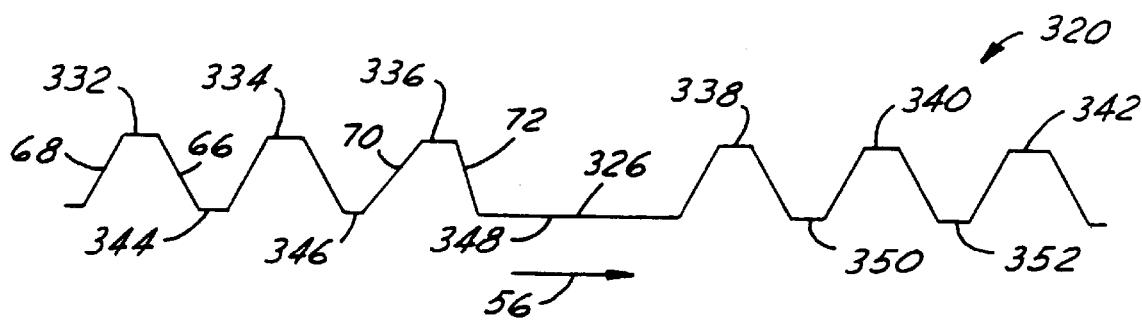
FIG. 5 is a view similar to FIG. 2, but illustrating still another embodiment of the present invention.

FIG. 5 illustrates yet another alternate embodiment of the present invention, similar to FIG. 2, illustrating six teeth of a sensor wheel 320. For this embodiment, those elements that are altered from the first embodiment will be designated with a 300-series number. For this sensor wheel 320, the sensor teeth 332, 334, 338, 340, 342 have angled leading and trailing faces 66, 68, respectively, while the lands 344–352 are all at the same radial distance. This embodiment illustrates a sensor wheel 320 wherein all of the teeth have sloped faces.

In order to correct the flux path to obtain the desired zero crossings, the slope of the leading 72 and trailing 70 face for the tooth 336 on the trailing side of the gap 326 are modified. For the leading face 72, it has a greater slope to provide for a smaller tooth and delayed timing for the sensor detecting the leading edges of the tooth 336. For the trailing face 70, it has a lesser slope to provide for larger tooth 336. These changes to the tooth geometry about the gap 326 will correct for the zero crossing error in the signal due to the missing tooth location.

Of course, while the different embodiments have illustrated individual aspects of a sensor wheel that can be changed to correct the magnetic characteristics in order to obtain the proper timing of zero crossings in the signal, a combination of these variations in tooth geometry and lands can be used to make this correction, if so desired. Also, for example, the wheel may be formed from different materials, where the material adjacent the gap is different than in the rest of the sensor wheel, thereby correcting the magnetic characteristics in order to obtain the desired timing. Thus, while certain embodiments of the present invention have been described in detail, those familiar with the art to which this invention relates will recognize various alternative designs and embodiments for practicing the invention as defined by the following claims.

We claim:

1. A method of sensing rotational information of a shaft with a toothed wheel rotationally fixed thereto, the method comprising the steps of:

providing the toothed wheel with a predetermined number of teeth spaced about a periphery of the toothed wheel and a missing tooth forming a gap;

rotating the shaft in a predetermined direction about a center of a rotation;

creating a magnetic field proximate to the periphery of the toothed wheel with an inductive sensor;

sensing the variations in magnetic flux in the magnetic field as the teeth pass;

altering the magnetic flux in the gap and the teeth rotationally trailing the gap to account for the loss of flux coupling at the gap;

creating a periodic signal in response to the variations in flux; and transmitting the periodic signal to a processor.

2. The method of claim 1 further including the step of filtering out from the signal received by the processor the voltage representing every other tooth and the gap.

3. The method of claim 2 wherein the step of creating a periodic signal comprises creating a generally sinusoidal voltage signal with zero crossings.

4. The method of claim 3 further including the step of time stamping zero crossings of sinusoidal signal.

5. The method of claim 4 wherein the step of altering the magnetic flux alters the periodic signal so that the timing of zero crossings for the teeth rotationally trailing gap are substantially the same as if a tooth is located in the missing tooth gap.

6. The method of claim 1 wherein the step of creating a periodic signal comprises creating a generally sinusoidal voltage signal with zero crossings, and further including the step of time stamping zero crossings of sinusoidal signal.

7. The method of claim 6 wherein the step of altering the magnetic flux alters the periodic signal so that the timing of zero crossings for the teeth rotationally trailing gap are the same as if a tooth is located in the missing tooth gap.

8. The method of claim 6 further including the step of converting the zero voltage crossings of sinusoidal voltage signal into a square wave signal.

9. The method of claim 1 wherein the step of creating a magnetic field comprises supplying a voltage to a variable reluctance sensor proximate the sensor wheel.

10. The method of claim 1 wherein the step of creating a magnetic field comprises supplying a voltage to a Hall Effect sensor proximate the sensor wheel.

11. The method of claim 1 wherein the step of altering the magnetic flux comprises providing a land in the gap that is radially farther from the center of rotation than lands between the other teeth on the sensor wheel.

12. The method of claim 1 wherein the step of altering the magnetic flux comprises providing a tooth of the n minus 1 teeth, adjacent to and rotationally trailing the gap, which has a geometry that is different from the other teeth on the sensor wheel.

13. A method of sensing rotational information of a shaft with a toothed wheel rotationally fixed thereto, the method comprising the steps of:

providing the toothed wheel with a predetermined number of teeth spaced about a periphery of the toothed wheel and a missing tooth forming a gap;

rotating the shaft in a predetermined direction about a center of rotation;

creating a magnetic field proximate to the periphery of the toothed wheel with an inductive sensor;

sensing the variations in magnetic flux in the magnetic field as the teeth pass;

altering the magnetic flux in the gap and the teeth rotationally trailing the gap to account for the loss of flux coupling at the gap;

creating a periodic signal in response to the variations in flux that is generally sinusoidal with zero voltage crossings;

transmitting the periodic signal to a processor; and time stamping zero crossings of the sinusoidal signal.

14. The method of claim 13 further including the step of converting the zero voltage crossings of sinusoidal voltage signal into a square wave signal.

15. The method of claim 14 wherein the step of creating a magnetic field comprises supplying a voltage to a variable reluctance sensor proximate the sensor wheel.

16. The method of claim 15 further including the step of filtering out from the signal received by the processor the voltage representing every other tooth and the gap.

17. A method of sensing rotation information for a rotational sensing system employing a ferromagnetic rotating toothed wheel with a predetermined number of teeth having generally the same geometry spaced thereabout and having a missing tooth forming a gap, and an inductive sensor mounted proximate the toothed wheel, the method comprising the steps of:

rotating the toothed wheel in a predetermined direction;

supplying a voltage to the inductive sensor, generating a generally sinusoidal voltage signal with a zero crossings;

varying the geometry of one of the teeth, adjacent to and trailing the gap such that the timing of some of the zero crossings are altered;

transmitting the signal to a processor; and time stamping the zero crossings.

18. The method of claim 17 further including the step of employing the signal generated from every other tooth about the sensor wheel in rotation information calculations.

19. The method of claim 17 further including the step of converting the zero voltage crossings of the signal into a square wave signal.

20. The method of claim 17 wherein the step of varying the geometry of one of the teeth includes providing a tooth adjacent to and trailing the gap that is wider than the other teeth on the sensor wheel.

* * * * *